April 1, 1952 — R. T. CORNELIUS — 2,591,407
PRESSURE REGULATOR
Filed Jan. 11, 1946
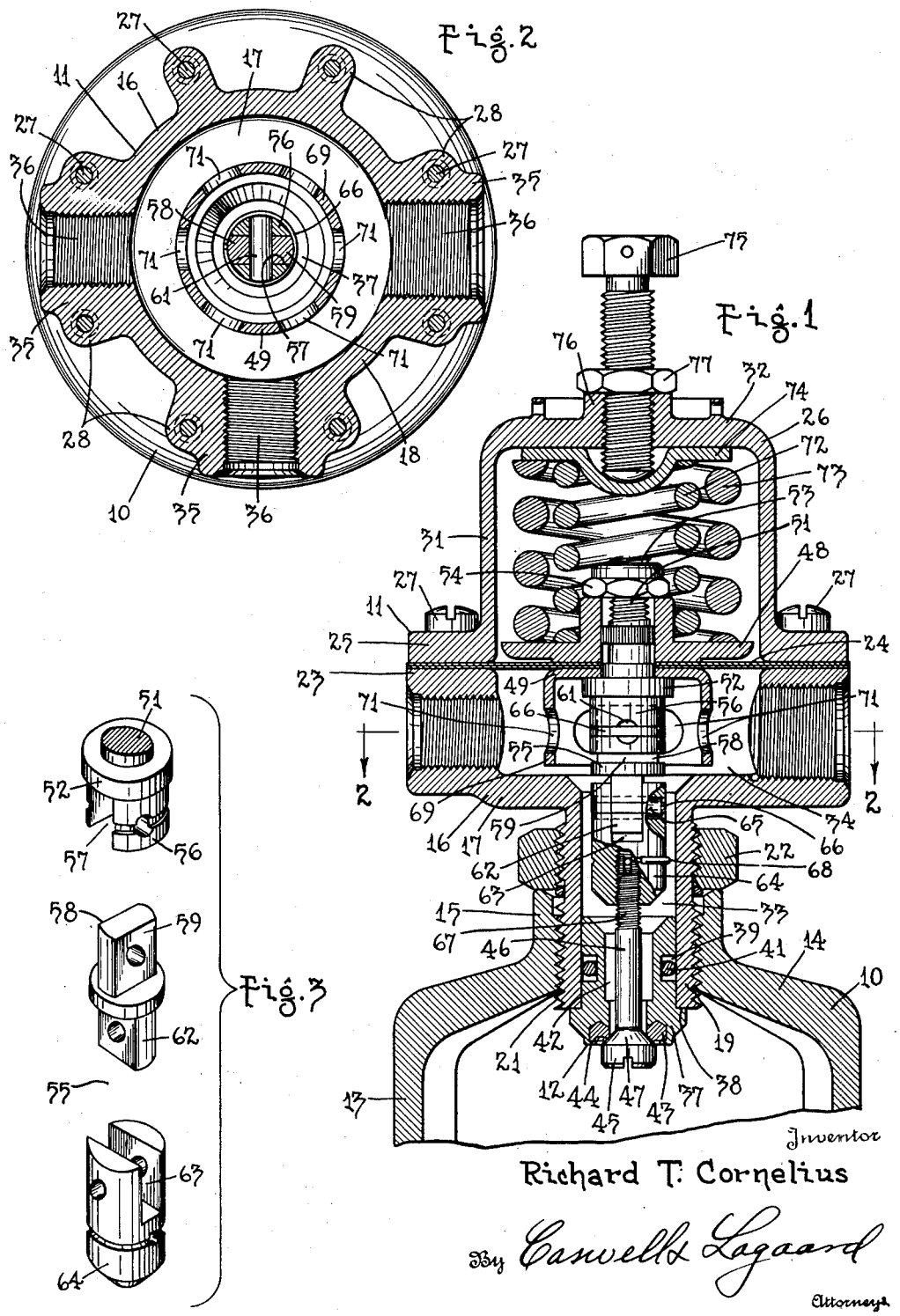
Inventor
Richard T. Cornelius
By Carwell & Lagaard
Attorneys Patented Apr. 1, 1952

2,591,407

UNITED STATES PATENT OFFICE 2,591,407

PRESSURE REGULATOR

Richard T. Cornelius, Minneapolis, Minn.

Application January 11, 1946, Serial No. 640,459

2 Claims. (Cl. 50—23)

My invention relates to pressure regulators and has for its object to provide a pressure regulator particularly adapted for use with fluid under high pressure.

Another object of the invention resides in providing a pressure regulator in which the disadvantages of frosting due to rapid expansion of the gases in passing through the regulator are overcome.

An object of the invention resides in providing a construction utilizing a pressure regulating valve having a valve head and in mounting the valve in a manner to cause positive and effective seating of the valve head.

Another object of the invention resides in providing a construction utilizing a diaphragm for operating the valve and connecting the valve head to the diaphragm through a universal joint.

Another object of the invention resides in providing a construction in which the movement of the diaphragm is limited by a device capable of resisting appreciable pressure.

A still further object of the invention resides in arranging the valve within the container of the pressure regulator in such a manner that the same lies inwardly within the container and free from the surface of the container through which the outlet for the pressure regulator extends.

A still further object of the invention resides in utilizing a valve seat for the pressure regulator constructed of some suitable heat-insulating material.

Other objects of the invention reside in the novel combination and arrangement of parts and in the details of construction hereinafter illustrated and/or described.

In the drawings:

Fig. 1 is a longitudinal elevational sectional view of a pressure regulator illustrating an embodiment of my invention.

Fig. 2 is a plan sectional view taken on line 2—2 of Fig. 1.

Fig. 3 is a perspective view of a portion of the valve mechanism showing the parts separated from one another.

In the use of pressure regulators for fluid under high pressure, considerable frost is developed when the fluid is discharged through a small valve passageway and particularly when humid air or other fluid is contained within the container of the regulator. The present invention provides a construction whereby the disadvantages from the frost are overcome.

The pressure regulator shown in the drawings comprises a container 10 for fluid under pressure which has a pressure regulating device 11 connected therewith. Pressure regulating device 11 includes a valve mechanism 12 and by means of which the flow of fluid from the container 10 is controlled. These various parts will now be described in detail.

The container 10 is preferably constructed as a tube having a cylindrical wall 13 and an end wall 14 at the upper end of the said cylindrical wall. Such containers being well known in the art, the entire container has not been illustrated, but it will be readily comprehended that a corresponding end wall is provided at the lower end of the container. The upper end wall 14 is formed with a boss 15 threaded to receive a portion of the pressure regulating device 11.

The pressure regulating device comprises a body 16 having a bottom wall 17 and a circumferential wall 18 together with a tubular portion 19 depending from said bottom wall. This tubular portion is threaded at 21 to screw into the threaded boss 15 of container 10, and serves as a fitting for attaching the pressure regulating device 11 to the container 10. A lock nut 22, also screwed upon the threaded tubular portion 19, holds the device firmly attached to the container 10 and also prevents leakage past the threads of the said parts.

At the upper end of the circumferential wall 18 of the body 16 is formed a flange 23. Overlying this flange is a diaphragm 24. This diaphragm is clamped in between a corresponding flange 25 formed on a cup-shaped closure 26 overlying the body 16. The closure 26 is held in position upon the body 16 by means of screws 27 which pass through the flange 25 of said closure and are screwed into bosses 28 formed in the body 16. The closure 26 has a circumferential wall 31 connected to the flange 25 and an end wall 32 extending across the outer end of the circumferential wall 31. By means of the construction described, a passageway 33 is formed in the tubular portion 19 of the body 16 which communicates with a chamber 34 within the annular wall 18 of the said body. The wall 18 of the body 16 is provided at suitable localities with bosses 35 which are threaded as indicated at 36 to receive tube or pipe fittings not illustrated in the drawings. By means of these threaded bosses, inlet and outlet passageways to the chamber 34 are provided and also a place for attachment of a pressure gauge is provided.

The valve mechanism 12 includes a bushing 37 which is inserted in the lower end of the tubular portion 19 of body 16 and which is formed with a shoulder 38 limiting the outward movement of said bushing with respect to the container 13. This bushing has a groove 39 formed therein in which an O-ring 41 is placed and by means of which a tight connection between the said bushing and the tubular portion 19 of housing 16 is procured. The bushing 37 has a bore 42 extending through the same. At the lowermost end of the bushing is provided an annular insert 43 constructed of a heat insulating material such as any of the numerous plastic substances now available on the market. This insert is formed with a valve seat 44 at the lowermost portion of the same. It will be noted that this valve seat is located well inwardly of the end wall 14 of container 13, so that any frost accumulating on the same is free from the container proper and to which the said frost would readily adhere to cause closure of the valve mechanism and prevent proper discharge of fluid from the container.

Cooperating with a valve seat 44 is a valve head 45 mounted on a valve stem 46 which extends freely through the bore 42 of the bushing 37. The valve head 45 has a spheroidal surface 47 which is adapted to engage the valve seat 44 of insert 43 and which is adapted to seat against the same at various angular positions of the said valve stem.

The diaphragm 24 is backed on the upper surface by a backing member 48 and is provided on its under surface with a clamp member 49. A threaded spindle 51 extends through the said clamp member, diaphragm and backing member and is provided with a flange 52 engaging the inner surface of the clamping member 49. The extreme end 53 of the spindle 51 is threaded to receive a nut 54 which draws the clamping member 49 and the backing member 48 together to securely clamp the diaphragm 24 therebetween.

Between the spindle 51 and the valve stem 46 is provided a universal joint 55, best illustrated in Fig. 3 and which is constructed as follows: The lower end of the spindle 51 below the diaphragm 24 is constructed with a bifurcated head 56 having a slot 57 extending therethrough. A coupling member 58 is formed with a tongue 59 adapted to be received within the slot 57. A pin 61 extends jointly through said slot and tongue. The coupling member 58 is further constructed with another tongue 62 which is disposed below the tongue 59 and which extends at right angles thereto. This tongue is adapted to be received within a slot 63 formed in a nut 64. A pin 65 extends jointly through the nut 64 and the tongue 62 and pivots the same for relative movement. By means of this construction, the nut 64 may have universal swinging movement with respect to the spindle 51 and to the diaphragm 24. The pins 61 and 65 are held in position by means of clamping rings 66 which encircle the head 56 and the nut 64 at the locality of the pins 61 and 65. The upper end of the valve stem 46 is threaded as indicated at 67 to receive the lower end of the nut 64 which is correspondingly threaded for cooperation therewith. A cotter key 68 engages the end of the stem 46 and holds the same in adjusted position with reference to the nut 64.

For limiting the opening movement of the valve head 45, the clamping member 49 is provided with a depending skirt 69. This skirt is adapted to engage the upper surface of the bottom wall 17 of the body 16. Openings 71 in the said skirt permit passage of fluid therethrough and bring the outer portion of the chamber 34 in communication with the passageway 33.

The valve head 45 is urged into open position by means of two concentric coil springs 72 and 73 which are seated at one end against an end plate 74 disposed beneath the wall 32 of closure 26. The other ends of these springs are seated upon the backing member 48. A screw 75, threaded in a boss 76 formed on said end wall is adapted to engage the end plate 74 and vary the pressure of the springs 72 and 73. This screw is held in adjusted position by means of a lock nut 77 screwed on the screw 75, and engaging the boss 76.

The operation of the device is as follows: Prior to the filling of the container 10 with fluid, springs 72 and 73 hold the valve head 45 unseated from the valve seat 44. When fluid under pressure is directed into the chamber 34 through one of the passageways leading into the same, the fluid flows through the openings 71 in the skirt 69 of clamping member 49, through the passageway 33, through the valve mechanism 12 and into the interior of the container 10. When the pressure within the chamber 34 becomes high enough, the same raises the diaphragm 24 against the action of springs 72 and 73 and closes the valve mechanism 12. If now the mechanism connected to the body 16 and to which fluid under pressure is to be delivered loses pressure, the pressure in the chamber 34 drops and springs 72 and 73 force the diaphragm 24 downwardly, opening the valve mechanism 12. Fluid now flows through the passageway between the surface 47 of the valve head 45 and the valve seat 44. Usually, the said passageway is extremely small and, due to the rapid expansion of the fluid flowing from the container 12 and to the chamber 34, a marked refrigeration effect is produced which tends to convert into frost all minute particles of water present in the gas passing through the valve mechanism. If the valve head and seat were located above the lowermost portion of the end wall of container 10 and within the tubular portion 19 of housing 16, the frost so formed would accumulate on the walls of the device and would quickly fill up the space and prevent the flow of fluid through the valve mechanism. By placing the valve seat and valve head at the lowermost point of the regulating device and well inwardly of the upper end wall 14 of container 10, any frost formed thereon is readily broken off when the valve head becomes again seated and drops to the bottom of the container. By the use of a heat insulating material for the insert 43 on which the valve seat 44 is formed, the formation of frost is greatly retarded and any frost formed does not readily adhere thereto.

The advantages of my invention are manifest. The device is extremely sturdy and rigid in construction and will withstand extremely high pressures such as several thousand pounds to the square inch. By means of the construction disclosed, the disadvantages of frosting at the locality of the discharge passageway through the valve mechanism is overcome. By means of the universal joint employed between the diaphragm and valve head, positive and effective seating of the valve head on the valve seat is procured. By the use of the particular form of clamping member for the diaphragm, a stop is provided which is extremely sturdy in form and which will resist the tremendous pressures procured by the pressure regulating springs of the pressure regulating device.

Changes in the specific form of my invention, as herein described, may be made within the scope of what is claimed without departing from the spirit of my invention.

Having described my invention, what I claim as new and desire to protect by Letters Patent is:

1. A pressure regulator comprising a tubular container having an upper end wall formed with a threaded outlet neck, a nipple screwed into said neck, a bushing in the lower end of said nippel having a groove extending about the same and a shoulder engaging the end of the nipple, an O-ring in said groove engaging the inner surface of the nipple, an insert in the end of said bushing and provided with a valve seat extending below the end wall of the container and said nipple, a valve for engagement with the valve seat and pressure responsive means for operating said valve.

2. A pressure regulator comprising a tubular container for fluid under pressure having an upper wall formed with an outlet therein, a tubular fitting attached to said container at said outlet and having a portion extending through and below said wall, a bushing in the lower end of said fitting having a groove extending about the same and a shoulder engaging the lower end of said fitting, an O-ring in said groove engaging the inner surface of the fitting, an insert in the end of said bushing and provided with a valve seat extending below the upper wall of the container and said fitting, a valve for engagement with said valve seat and pressure responsive means for operating said valve.

RICHARD T. CORNELIUS.

REFERENCES CITED

The following references are of record in the file of this patent:

UNITED STATES PATENTS

| Number | Name | Date |
|---|---|---|
| 717,990 | Harvey | Jan. 6, 1903 |
| 1,279,468 | Smith | Sept. 17, 1918 |
| 1,659,263 | Harris | Feb. 14, 1928 |
| 1,715,801 | Turner | June 4, 1929 |
| 1,807,200 | Dennison | May 26, 1931 |
| 1,893,859 | Gleason | Jan. 10, 1933 |
| 1,995,949 | Spence | Mar. 26, 1935 |
| 2,190,464 | Wile | Feb. 13, 1940 |
| 2,296,145 | Christensen | Sept. 1942 |
| 2,354,283 | St. Clair | July 25, 1944 |
| 2,393,805 | Parker | Jan. 29, 1946 |
| 2,483,572 | Cater | Oct. 4, 1949 |

FOREIGN PATENTS

| Number | Country | Date |
|---|---|---|
| 117,816 | Germany | of 1898 |
| 192,499 | Germany | of 1906 |
| 396,308 | Great Britain | of 1933 |